(12) United States Patent
Kreidler et al.

(10) Patent No.: US 7,567,853 B2
(45) Date of Patent: Jul. 28, 2009

(54) METHOD AND SYSTEM FOR THE ELECTRONIC PROVISION OF SERVICES FOR MACHINES VIA A DATA COMMUNICATION LINK

(75) Inventors: Volker Kreidler, Hechingen (DE); Knut Lagies, Erlangen (DE); Wolfgang Mutscheller, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 11/585,683

(22) Filed: Oct. 23, 2006

(65) Prior Publication Data
US 2007/0093929 A1     Apr. 26, 2007

Related U.S. Application Data

(60) Continuation of application No. 11/205,703, filed on Aug. 17, 2005, now Pat. No. 7,127,322, which is a division of application No. 10/052,293, filed on Jan. 18, 2002, now Pat. No. 6,954,680.

(60) Provisional application No. 60/305,199, filed on Jul. 13, 2001.

(51) Int. Cl.
| | |
|---|---|
| G06F 19/00 | (2006.01) |
| G05B 15/02 | (2006.01) |
| G05B 19/18 | (2006.01) |
| G06F 11/30 | (2006.01) |
| G21C 17/00 | (2006.01) |
| G06Q 30/00 | (2006.01) |
| G06F 17/30 | (2006.01) |
| G06F 7/00 | (2006.01) |
| G06F 15/16 | (2006.01) |

(52) U.S. Cl. ............................. 700/169; 700/9; 700/96; 700/108; 700/174; 702/183; 702/188; 705/26; 707/10; 709/203; 709/218

(58) Field of Classification Search ................. 700/2–4, 700/9, 19–21, 83, 86, 96, 110, 138–140, 700/169, 174–178, 241, 253, 108; 702/182–185, 702/188; 705/400, 412, 418, 26; 707/10; 709/218, 203; 712/28
See application file for complete search history.

(56) References Cited

U.S. PATENT DOCUMENTS 3,882,305 A     5/1975    Johnstone (Continued)

FOREIGN PATENT DOCUMENTS

DE     196 15 190 A1     10/1997

(Continued)

OTHER PUBLICATIONS

U.S. Appl. No. 09/950,731, filed Sep. 12, 2001, Kreidler et al.

(Continued)

*Primary Examiner*—Crystal J Barnes Bullock
(74) *Attorney, Agent, or Firm*—Scott T. Weingaertner; King & Spalding LLP

(57) ABSTRACT

With this invention, expert knowledge from machine manufacturers is applied quickly at any time to a machine via the Internet, by providing a main computer (host) for the production and provision of machine-related data and/or services and a machine-side working computer (client), which is connected to the main computer via a data communication link and by means of which (client) machine state data can be acquired in real time and transmitted to the main computer, and by means of which machine-related data and/or services generated by the main computer as a function of such machine state data can be received by means of an analysis and evaluation unit.

27 Claims, 6 Drawing Sheets

U.S. PATENT DOCUMENTS

| | | | |
|---|---|---|---|
| 4,390,953 A | | 6/1983 | Johnstone |
| 4,531,182 A | | 7/1985 | Hyatt |
| 4,855,906 A | * | 8/1989 | Burke .......................... 707/10 |
| 4,901,218 A | | 2/1990 | Cornwell |
| 4,943,927 A | * | 7/1990 | Yarita et al. ................. 700/140 |
| 4,974,181 A | | 11/1990 | Sinderson et al. |
| 4,991,077 A | * | 2/1991 | Kawasaki et al. ............. 700/83 |
| 5,088,045 A | * | 2/1992 | Shimanaka et al. ......... 700/110 |
| 5,212,645 A | | 5/1993 | Wildes et al. |
| 5,224,051 A | | 6/1993 | Johnson |
| 5,231,585 A | * | 7/1993 | Kobayashi et al. ............ 700/96 |
| 5,291,416 A | | 3/1994 | Hutchins |
| 5,335,048 A | | 8/1994 | Takano et al. |
| 5,339,257 A | | 8/1994 | Layden et al. |
| 5,394,334 A | * | 2/1995 | Simon ........................ 700/139 |
| 5,452,201 A | | 9/1995 | Pieronek et al. |
| 5,469,352 A | | 11/1995 | Yukutomo et al. |
| 5,648,898 A | | 7/1997 | Moore-McKee et al. |
| 5,726,912 A | | 3/1998 | Krall |
| 5,742,824 A | | 4/1998 | Kosaka |
| 5,805,442 A | | 9/1998 | Crater et al. |
| 5,844,795 A | | 12/1998 | Johnston et al. |
| 5,844,808 A | | 12/1998 | Konsmo et al. |
| 5,860,068 A | | 1/1999 | Cook |
| 5,975,737 A | | 11/1999 | Crater et al. |
| 5,978,578 A | | 11/1999 | Azarya et al. |
| 6,026,348 A | | 2/2000 | Hala |
| 6,061,603 A | | 5/2000 | Papadopolous et al. |
| 6,094,600 A | | 7/2000 | Sharpe, Jr. et al. |
| 6,115,649 A | * | 9/2000 | Sakata ........................ 700/241 |
| 6,208,904 B1 | * | 3/2001 | Mullen, Jr. .................... 700/9 |
| 6,263,487 B1 | | 7/2001 | Stripf et al. |
| 6,298,308 B1 | | 10/2001 | Reid et al. |
| 6,338,003 B1 | | 1/2002 | Kamguchi et al. |
| 6,385,497 B1 | | 5/2002 | Ogushi et al. |
| 6,393,380 B1 | | 5/2002 | Zemlo |
| 6,437,692 B1 | | 8/2002 | Petite et al. |
| 6,445,969 B1 | | 9/2002 | Kenney et al. |
| 6,463,352 B1 | | 10/2002 | Tadokoro et al. |
| 6,473,656 B1 | | 10/2002 | Langels et al. |
| 6,480,762 B1 | * | 11/2002 | Uchikubo et al. ........... 700/253 |
| 6,507,765 B1 | | 1/2003 | Hopkins et al. |
| 6,556,956 B1 | | 4/2003 | Hunt |
| 6,560,513 B2 | | 5/2003 | Krause et al. |
| 6,788,258 B2 | | 9/2004 | Olson |
| 6,799,195 B1 | | 9/2004 | Thibault et al. |
| 6,892,109 B2 | | 5/2005 | Ogushi et al. |
| 2001/0049567 A1 | | 12/2001 | Takeuchi |
| 2002/0007422 A1 | | 1/2002 | Bennett |
| 2002/0013639 A1 | | 1/2002 | Fujishima et al. |
| 2002/0049567 A1 | | 4/2002 | Vataja |
| 2002/0083145 A1 | | 6/2002 | Perinpanathan |
| 2003/0103827 A1 | | 6/2003 | Moller et al. |
| 2005/0010323 A1 | | 1/2005 | Cocciadiferro et al. |

FOREIGN PATENT DOCUMENTS

| | | |
|---|---|---|
| DE | 199 30 660 | 1/2001 |
| DE | 100 07 126 A1 | 9/2001 |
| EP | 0 051 861 A2 | 5/1982 |
| EP | 0 428 735 A1 | 5/1991 |
| EP | 0512 116 A1 | 11/1992 |
| EP | 0 822 473 A3 | 2/1998 |
| EP | 1 102 185 A2 | 5/2001 |
| EP | 0 875 023 | 7/2001 |
| EP | 1 115 080 | 7/2001 |
| JP | 09330113 A * | 12/1997 |
| JP | 11195572 A * | 7/1999 |
| JP | 2002004269 A * | 1/2002 |
| WO | WO 00/62138 | 10/2000 |
| WO | WO 00/73955 A2 | 12/2000 |
| WO | WO 01/50704 A2 | 7/2001 |

OTHER PUBLICATIONS

U.S. Appl. No. 09/950,726, filed Sep. 12, 2001, Kreidler et al.
U.S. Appl. No. 09/950,848, filed Sep. 12, 2001, Kreidler et al.
U.S. Appl. No. 10/052,293, filed Jan. 18, 2002, Kreidler et al.
Search Report issued in related German Application No. DE 101 52 765.9 and its translation.
Edgar Dittmar, "Using Computers For Control," Elektrotechnik, Vogel Verlag K.G., Würzburg, Germany, vol. 77, No. 1/2, Feb. 21, 1995, pp. 16, 18, 21-22.
Hans B. Kief: "NC/CNC Handbuch", 1995, Carl Hanser Verlag, München Wien, XP002227602, pp. 238-242; 296-267; and 318-319.
U. Rembold, P. Levi: Realzeitsysteme zur Prozessautomatisierung, 1994, Hanser Verlag, München, pp. 624-625; pp. 638-651; pp. 660-661.
Artikel Bosch "Typ3 osa—The universal NC, PLC, and PC control system", Nov. 12, 2001.
R. Fernandez: "An Object-Oriented Implementation of Low Level Digital Control Algorithms in the Microsoft Windows/C++ Environment", Proceedings of the International Symposium on Intelligent Control, Monterey, Aug. 27-29, 1995, New York, IEEE US, pp. 229-235.
Naoki Ura et al: "Remote Maintenance Function for Distributed Control System", Advances in Instrumentation and Control, Instrument Society of America, Research Triangle Park, US, vol. 48, Part 3, 1993, pp. 1557-1564, XP000428426.
DOD Standard Transmission Control Protocol, Information Sciences Institute, USA, Jan. 1980, pp. 1-83.
Michael Kmiec: "PhorSale 1.0.8B—An eCommerce application for PHP and mySQL, File: phorSale.sql", Online!, Jun. 14, 2001, FRESHMEAT:NET, XP002219121.
Judith S. Bowman, Sandra L. Emerson et al.: "The Practical SQL Handbook", Sep. 1998, Addison Wesley, Reading, Massachusetts, XP002219122, p. 63.
Erkes J.W. et al: "Implementing Shared Manufacturing Services on the World-Wide Web", Communications of the Association for Computing Machinery, New York, US, vol. 39, No. 2, Feb. 1, 1996, pp. 34-45.
International Search Report for PCT/EP02/07511.
International Search Report for PCT/EP02/07512.
International Search Report for PCT/EP02/07513.
International Search Report for PCT/EP02/07514.
Abstract of WO 90/02366, published Mar. 8, 1990.
Abstract of WO 01/02891, published Jan. 11, 2001.
Abstract of WO 97/39393, published Oct. 23, 1997.
Translation of Office Action issued in related Chinese Application No. CN 02814108.3.

* cited by examiner

METHOD AND SYSTEM FOR THE ELECTRONIC PROVISION OF SERVICES FOR MACHINES VIA A DATA COMMUNICATION LINK

This application is a continuation under 35 U.S.C. § 120 of U.S. patent application Ser. No. 11/205,703, filed on Aug. 17, 2005, now U.S. Pat. No. 7,127,322 B2, incorporated herein by reference, which is a divisional under 35 U.S.C. § 121 of U.S. patent application Ser. No. 10/052,293, filed on Jan. 18, 2002, now U.S. Pat. No. 6,954,680, incorporated herein by reference, which claims the benefit, under 35 U.S.C. § 119(e), of the priority date of U.S. Provisional Patent Application No. 60/305,199, filed on Jul. 13, 2001.

FIELD OF THE INVENTION

The invention relates to a system for computer-aided handling and management of a numerically controlled industrial processing machine, and an apparatus and a corresponding method for computer-aided provision of machine-related data and/or services.

BACKGROUND

In the area of industrial automation technology and, in particular, in the field of numerically controlled processing machines, manufacturers offer service in the form of control technology and corresponding software components for other manufacturers of original accessories (Original Equipment Manufacturer, OEM), who manufacture and market industrial processing machines.

Such OEMs generally have good relationships with their end-customers, who are often themselves manufacturers of accessories and operate the machines and their accessories acquired from the OEMs.

Such OEMs not only develop and market goods such as machine tools, but, going beyond this, also offer service for the products which they and others sell to end-customers. Since the marketed products are generally highly complex, there are high requirements for, and difficulties in, the provision of such services, for which a large amount of information is needed with reference to the operation of their machine tools.

The significant difficulties in the provision of such services consist in obtaining access to information needed for the service of the machines to be maintained. In this case, this also concerns to a great extent items of information that have to be obtained directly from the processing process of the machine tools. Appropriate software components for such machine tools or other industrial processing machines are generally highly specialized in terms of the implementation of the actual control task. With regard to the acquisition of machine data going beyond this, however, for the reasons mentioned above, beyond the immediate control of the machine, no further machine information is conventionally provided.

For these and other reasons, manufacturers of numerical control systems and corresponding software components for industrial processing machines were not in a position to supply performance improvements on such machines to their end-customers, directly or via OEMs, on the basis of knowledge-based information.

For this reason, there is a great need, on the basis of such ongoing machine state data, primarily for maintenance and service purposes, to make services and machine-related know-how available to end-customers as quickly as possible and at any location. As a result, the availability of such machines, their lifetime and their productivity may be decisively improved.

Previously, no methods or apparatus have been disclosed on the basis of which either services or software components could be developed that would permit services based on collected machine data. These would also permit automated services that were formerly not possible to implement. Moreover, it has not previously been possible to provide services tailored specifically to the processing machine of an end-customer within a reasonable time frame, since the capacities of the service providers are generally inadequate to do so.

For this reason, it is conventional for service personnel with corresponding know-how to be dispatched to the end-customer in order to: analyze the machine, physically and manually while on-site, and therefore primarily in response to specific requirements of the end-customers; to obtain appropriate machine data on-site; and, on this basis, to offer the corresponding maintenance or services.

In this way, however, it is not possible to offer real-time related, or particularly computationally-intensive, services such as axis analyses, for example, or other optimization, machine calibration, software services, machine data management or other dynamic intervention in the machine.

It is precisely this, however, that would be particularly important for end-customers in order for them to shorten their development times, to increase their market presence and to ensure maximum availability of the machines.

SUMMARY OF THE INVENTION

It is therefore an object of the present invention to provide a method and a corresponding apparatus which, without a physical presence on-site, also make available particularly computationally-intensive data or services from a manufacturer or provider of accessories for the machine of an end-customer.

According to the present invention, this object is achieved by a system for computer-aided handling and management of a numerically-controlled industrial processing machine, having the following features:

- a main computer (host) to produce and provide machine-related data and/or services and
- a machine-side working computer (client), which is connected to the main computer via a data communication link and by means of which (client) machine state data can be acquired in real time and transmitted to the main computer, and by means of which machine-related data and/or services generated by the main computer as a function of such machine state data can be received by an analysis and evaluation unit.

In this case, it has proven to be beneficial if the main computer has a communication link to a higher-order computer system of a machine manufacturer or a manufacturer of machine components, via which access to system data of the main computer can be granted to the higher-order computer system by the main computer. In this way, service routines, in particular software components, and the computing capacity of such a computer, can be used for the analysis of captured the machine data.

If the machine-side working computer (client) has a unique identification means with respect to the main computer (host), in particular an identification code, then the main computer (host) can associate machine state data received from this working computer with this working computer. In this way, comprehensive archives with machine-related data from various end-customers and machines can be generated, which can be used, for example, for statistical purposes or to construct a fault history.

The data communication link between the main computer (host) and the working computer (client) is advantageously a connection via an Internet or Intranet.

Here, it is possible for the determination of machine state data on the part of the working computer (client) to be controlled via instructions received from the main computer (host) via the Internet or Intranet.

This succeeds particularly effectively if Internet pages or Intranet pages for the user-aided selection of options provided therein can be transmitted from the main computer (host) to the working computer (client).

Furthermore, the object of the invention is also achieved by a method for computer-aided production and provision of machine-related data and/or services for a numerically-controlled industrial processing machine, a main computer (host) and a machine-side working computer (client) communicating via a data communication link, having the following method steps:

acquisition of machine state data on the part of the working computer (client), transmission of the acquired machine state data via the data communication link to the main computer (host), generation of machine-related data and/or services on the part of the main computer (host) as a function of such machine state data and provision of these machine-related data and/or services to the working computer (client) or its user.

Here, it has proven to be particularly beneficial if machine state data are acquired in real time on the part of the working computer (client).

Here, too, the advantages already mentioned with regard to data archiving can be achieved by a unique identification means, in particular an identification code, associated with the machine-side working computer (client) being transmitted to the main computer (host). To this end, the main computer (host) associates machine state data received from a working computer to this working computer by using the identification means.

In this way, the creation of a database with machine-related data for a plurality of industrial processing machines is enabled, whereby a common main computer (host) performing computer-aided generation and provision of machine-related data and/or services, as described above, for a plurality of working computers (clients) is associated with the industrial processing machines, and whereby a data set with the machine state data from one of the working computers (clients) is generated in a storage means and the unique identification code associated with this working computer is determined, and an item of information corresponding to the identification code is appended to the data set.

The machine state data preferably comprise program data, servo data, motor data, converter data, position data or sensor data. Furthermore, however, depending on the application, additional machine state data can also be determined.

According to a further advantageous refinement of the method of the present invention, the working computer (client) buffers the acquired machine state data in a storage means before the data are transmitted to the main computer (host).

Such a transmission of machine state data stored in the storage means is preferably carried out via the data communication link to the main computer (host) under time control or event control. Furthermore, it is advantageous if automatic analysis or evaluation of received machine state data is carried out on the part of the main computer (host).

The object of the invention is further achieved by a method for computer-aided provision of machine-related data and/or services from a main computer of a service provider to a working computer of a processing machine of a customer via a network, the working computer of the processing machine of the customer having a system for the control and/or monitoring of the processing machine and a suitable sensor for acquiring machine state data and being connected to the network, having the following method steps:

transmission of information relating to the availability of machine-related data and/or services from the main computer to the working computer, receipt of a request for machine-related data and/or a service from the working computer on the part of the main computer, transmission of information with reference to requisite machine state data to be acquired by the working computer from the main computer to the working computer, receipt of data from the working computer containing the requisite machine state data on the part of the main computer, generation of the machine-related data requested by the working computer and/or the requested service by the main computer and transmission of the machine-related data requested by the working computer and/or the requested service from the main computer to the working computer.

In order to register the cost incurred by the services provided, it is further advantageous if the main computer receives and stores information with respect to a payment for requested machine-related data and/or services from the working computer. In order to register price information for payment, the following further method steps have additionally proved to be beneficial:

determination of a first item of price information as fixed costs of a predetermined repeated time period, in particular a monthly time period, determination of a second item of price information as variable costs as a function of a service provided.

For the computer-aided provision of services for optimization purposes, according to a further advantageous embodiment of the invention, the following further method steps are carried out:

generation of a data structure to accommodate data with reference to a service, storage of first data in the data structure, which represent the identity of a customer, in particular of the unique identification code, and storage of further data in the data structure, which represent the identity of the service.

Here, the following further method steps have proven to be advantageous:

determination of measured data with reference to the service provided to the customer and storage of further data in the data structure, which represent these measured data.

Furthermore, the object of the invention is achieved by an apparatus for computer-aided provision of machine-related data and/or services on a main computer of a service provider for a working computer of a processing machine of a customer via a network, in particular with a system for computer-aided handling and management of a numerically controlled industrial processing machine as outlined above, the working computer of the processing machine of the customer having a system for the control and/or monitoring of the processing machine and a suitable sensor for acquiring machine state data and being connected to the network, having the following further main computer features:

a means for transmitting
        information relating to the availability of machine-related data and/or services from the main computer to the working computer and
        information with reference to requisite machine state data to be acquired by the working computer from the main computer to the working computer and
        the machine-related data requested by the working computer and/or the requested service from the main computer to the working computer and
    a means for the receipt
        of a request for machine-related data and/or a service from the working computer on the part of the main computer and
        of data from the working computer containing the requisite machine state data on the part of the main computer and
    a means for generating the machine-related data requested by the working computer and/or the requested service by the main computer.

This may be implemented particularly effectively if the means for generating the machine-related data requested by the working computer and/or the requested service by means of the main computer comprises an Internet web server and the main computer is suitably programmed to use it to produce Internet web pages.

Here, too, it is advantageous if the working computer of the customer has a unique identification means, in particular an identification code, for the processing machine and if the main computer has a storage means, in particular a database, to accommodate information from the working computer in conjunction with the identification code.

Finally, the object of the invention is also achieved by means of an apparatus for computer-aided provision of services for an automation system via a network, in particular with a system, described above, for computer-aided handling and management of a numerically controlled industrial processing machine, having the following features:

a means for loading instructions into the automation system, the instructions controlling at least one function or another aspect of the automation system,
    a means for receiving customer-related system data from the automation system via the network, such system data being collected as a function of the loaded instructions,
    a means for generating suitable services for the automation system as a function of the collected customer-related system data and
    a means for transmitting such services to the automation system of the customer via the network.

Here, it has proved to be beneficial if a means for providing a selection of options of the service is provided on the automation system of the customer via the network. This, likewise, applies to a means for selecting one of the options of the service on the part of the automation system of the customer.

Further advantages are obtained if the automation system has a network interface for communication via the network and for receiving the service information, and a means (machine agent) is provided for generating machine-executable program sequences on the basis of the received services, the network interface and the means for generating machine-executable program sequences exchanging data via a predefined data format. This succeeds particularly effectively if the network interface comprises an Internet browser.

The above-described method according to the invention may be used particularly well for remote commissioning or remote maintenance of an industrial working machine.

In addition, a use is also recommended for implementing a subset of the following measures:

electronic measurement of workpieces, tools and clamping means for the diagnosis of problems in the event of deficient workpiece quality or for the dialog-guided correction of the relationships,
    indication of the relationships of process variables such as laser output, feed speed or tool rotational speed and feed speed,
    analysis of the tool paths in the Cartesian coordinate system, with correction or statements relating to a good part/poor part,
    monitoring of process variables with limiting value monitoring and/or correlation monitoring,
    program analysis by processing a program in a virtual simulation of the processing machine,
    automatic creation of commissioning logs for the seamless documentation of the commissioning state,
    automatic creation of service and maintenance logs for the seamless documentation of the machine history,
    evaluation for the diagnosis of exceptional and fault situations,
    saving and archiving configuration data, user data and programs for the reconstruction of states or for the detection of changes affected by problems.

Such an online service according to the invention, also referred to below as an ePS network (electronic production services) improves the machine availability for the manufacturers and increases the availability of the machines for the users.

The E-business infrastructure according to the invention permits the machine manufacturers to maintain the machines of their customers significantly more simply and more efficiently. All ePS services are carried out with high online safety.

ePS services which are offered to the machine users are based on minimizing the operating costs, increasing the lifetime of the machine, improving the product quality, increasing productivity and ensuring maximum availability of the production means.

BRIEF DESCRIPTION OF THE FIGURES

Further advantages and details of the present invention emerge by using the exemplary embodiments illustrated in the following text and in conjunction with the figures. In each case in a basic representation.

DETAILED DESCRIPTION OF THE INVENTION

Figure 1:
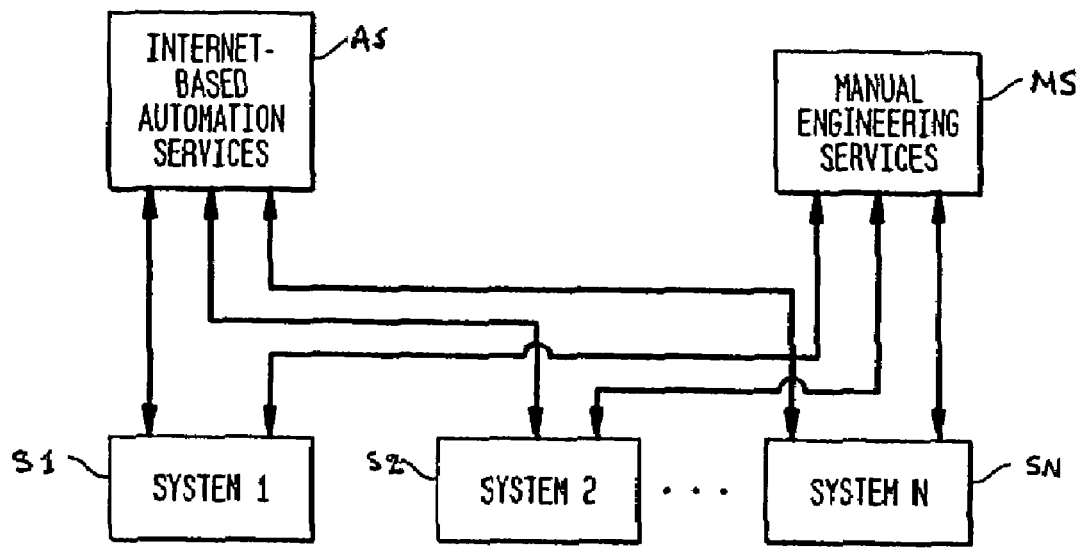
FIG. 1 shows a block diagram of a system according to the invention for providing automated services via a network, and also alternative or supplementary manual services.

The representation according to FIG. 1 shows, at a high level of abstraction, how, on the basis of an Internet connection, automatic services AS or data contents or software components required for this purpose are made available to a plurality of end-customers having machines S1 . . . SN, with which information is exchanged bi-directionally. In addition, a conventional provider MS of manual services or engineering services (e.g. OEM) is shown, who likewise communicates with the final customers and their machines S1 . . . SN, but in a conventional way. The drawback with such an arrangement or such a system is that no communication takes place between the provider of the Internet-based automatic services and the provider of conventional manual services. As a result, it is not possible for the technical expertise available on both sides to be used.

Figure 2:
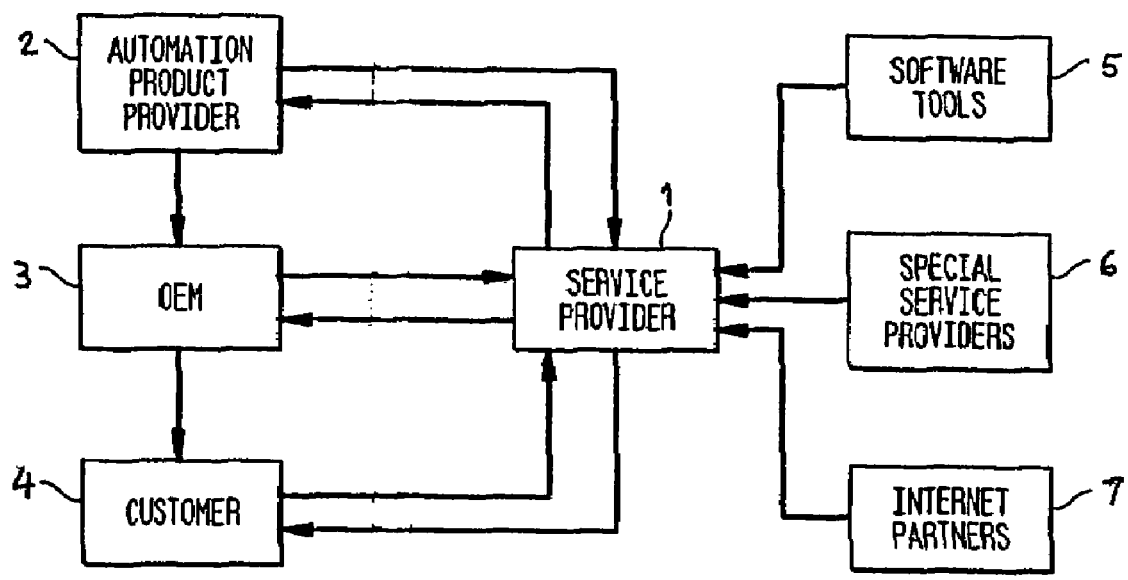
FIG. 2 shows a block diagram of a system according to the present invention for providing automated services and/or data to an end-customer via a network.

The representation according to FIG. 2 shows, in the left-hand area of the figure, the conventional production chain or supplier chain of machine tools. A supplier 2 of an automation product, who accepts responsibility for the control hardware and software, markets his products and services to a customer, as a rule, a machine tool OEM 3. The OEM, for his part, constructs the actual machine tool on the basis of the control systems acquired with additional, self-manufactured or purchased components. This machine tool is normally marketed to end-customers 4, as they are known, who are generally fabrication companies.

A provider 1 of the automated services according to the invention on the basis of a network, in particular an Internet connection, is generally in mutual communication with all three of the aforementioned parties. A provider 1 of automated services according to the invention is preferably also in contact with further providers of software tools 5 or specific services 6 and also with further Internet partners 7 (cf. right-hand area of the figure).

Figure 3:
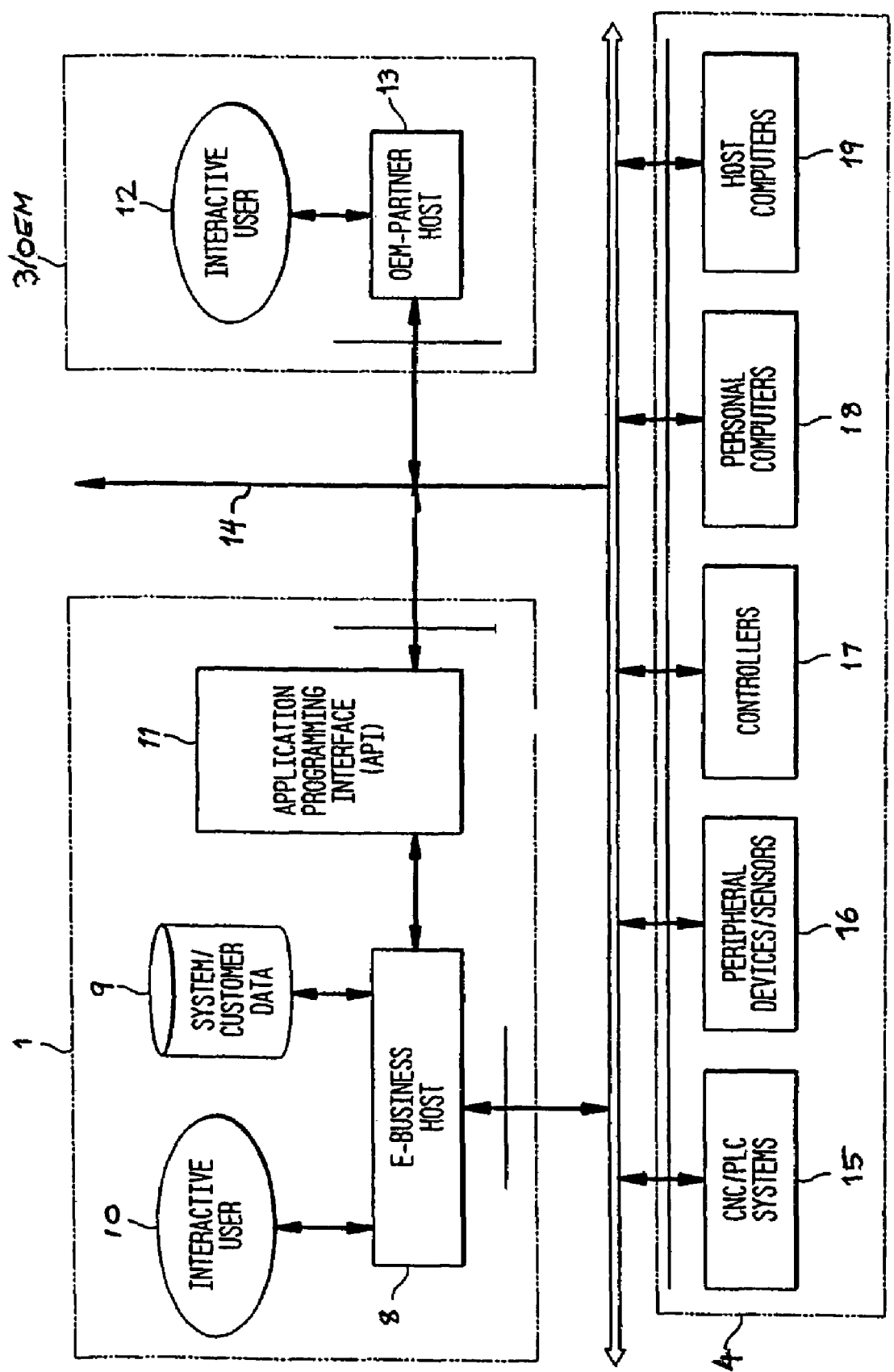
FIG. 3 shows a block diagram of an advantageous embodiment according to the invention.

FIG. 3 now shows a more detailed representation of the main actors 1, 3 and 4 from FIG. 2. The service provider 1 has an e-business main computer or host 8, which communicates with a system or customer database 9 and is operated by an interactive user 10. Via an open application programming interface 11 (API), as it is known, an OEM partner 3 is permitted access to the data content provided by the main computer 8.

A further interactive user 12 on the side of the OEM partner 3 can, in this way, profit from access to the aforementioned customer data or the customer database 9, as will be explained in more detail later. This preferably takes place by means of communication by means of a main computer or host 13 on the side of the OEM partner 3, via a network connection, for example an Internet connection 14. For this purpose, measures are preferably used for secure communication, for example encryption methods (channel encryption or asymmetric document encryption) and also methods of securing data integrity (for example generation of hash values).

On the end-customer side 4, via appropriate interfaces, components 15 to 19 are connected to the network, for example the Internet connection 14, and, therefore, to the systems of the service provider 1 and the OEM partner 3. These components on the end-customer side 4 may be both components to be maintained and components that supply data (for example CNC/PLC systems 15, peripheral devices or sensors 16, controllers 17, workstation computers or PCs 18 or main computers/hosts 19).

Figure 4:
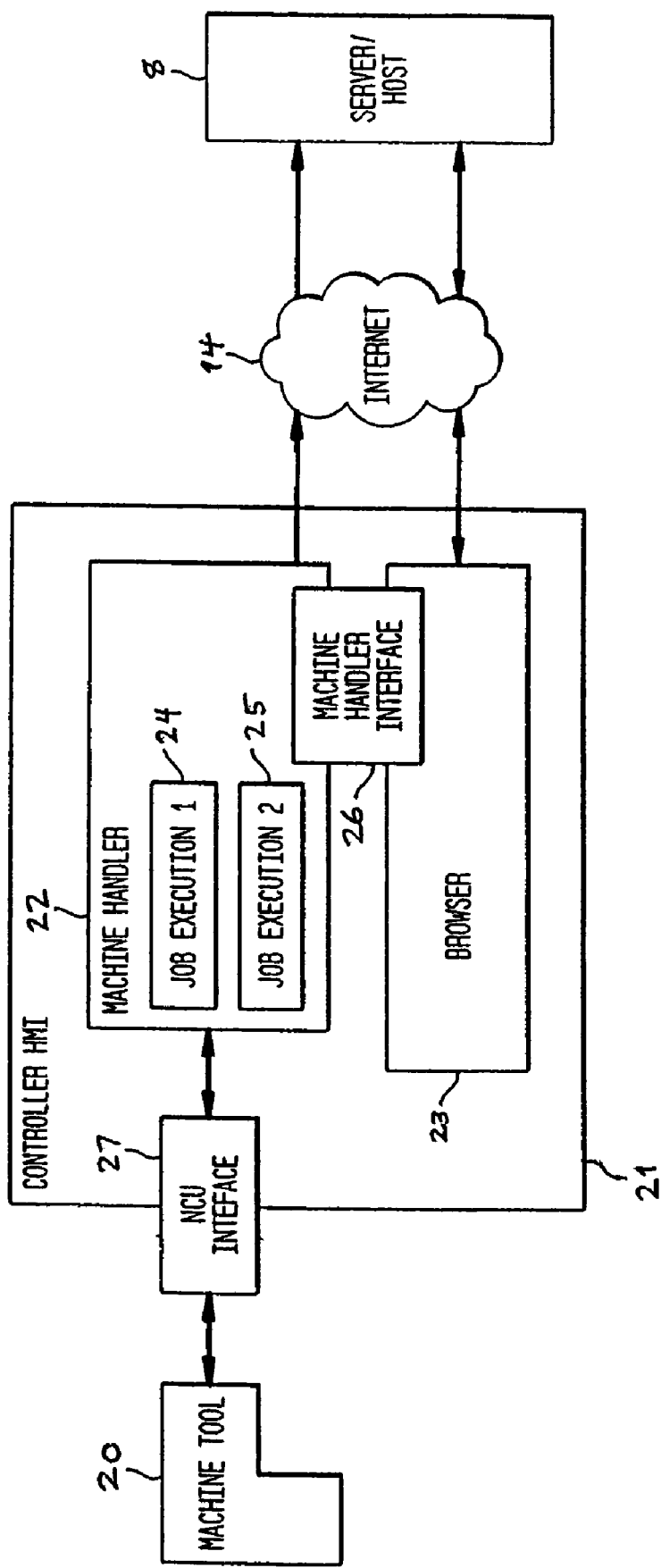
FIG. 4 shows a further block diagram of a client-server architecture based on the present invention with emphasis on the client/working computer side.

The representation according to FIG. 4 now shows the structural and functional relationship according to the present invention between a client system or working computer 21 belonging to an end-customer and a main computer 8 of a service provider, and also an exemplary machine tool 20. In this case, particular emphasis is placed on the technical implementation on the part of the client/working computer of an end-customer. The client system or the working computer 21 of the end-customer comprises, inter alia, a controller with a human-machine interface (HMI), that is to say the area of the controller with which a machine operator interacts. Via this interface, access to various applications is granted. In addition, a numerical controller NC is provided, which comprises a control unit NCU and a control core NCK.

The controller of the human-machine interface 21 of the working computer has a bidirectional communication link to the main computer 8 of the provider of automated services via a network, preferably via an Internet connection 14. This is preferably provided via an Internet browser 23, which runs on the software layer of the operating system of the working computer and via which Internet pages—web pages, as they are known—can be loaded from the main computer 8.

A machine operator can, in a conventional way, access an Internet page, in order to request specific data contents from the main computer. The main data transfer takes place from the main computer 8 to the Internet browser 23. Stimulated by reactions of a machine operator, the selection of specific options or parameters, for example, associated information is then transported back to the main computer 8 via the Internet connection 14 (for example the world-wide-web WWW). In this phase of the communication between working computer 21 and main computer 8, however, no control-related data are, as yet, transmitted to the main computer 8.

Furthermore, the working computer/client 21 also has a machine service program or machine agent 22, which likewise executes in the context of the human-machine interface and the numerical control and is in a position to accept command instructions from the main computer side 8 and to generate machine-executable jobs 24, 25, as they are known, which can be executed directly by the numerical controller. For this purpose, the machine agent 22 is connected to the actual machine tool 20, a robot or the like via a control interface 27 (NC interface).

The machine agent 22 and the browser 23 communicate via a machine agent interface 26, which converts services or data loaded from the main computer 8 via the browser 23 into a machine-executable format. Machine-executable jobs 24, 25 generated in this way can include both instructions to execute one or more machine-tool commands to be carried out by the numerical controller, and also instructions to acquire available machine state data or other control-related data. Data acquisition can be carried out on the basis of already existing sequence tracking, as it is known, or trace functionality, of known machine-tool systems. Within the scope of the present invention, however, improved trace functionalities for acquiring machine state data can also be imagined, and will be presented at a later point.

For safety reasons, it is also possible to imagine that the initiation of machine-tool commands assumes some manual release by a machine operator. Acquired machine state data can then be transmitted to the main computer 8 from the machine agent 22 in conjunction with a job and the sequence of such jobs to be processed. Such a data transfer is indicated in the context of FIG. 4 by the upper arrows, which run only from left to right. Such a transfer is therefore preferably unidirectional and does not necessarily have to comprise a communication link via the Internet; instead, it is also possible to imagine any desired other network link, for example by means of a remote access, as it is known, to a local network LAN belonging to the service provider 1.

In this connection, the object is primarily to select a secure and, above all, also a fast communication link. This is because it is not always possible to ensure that machine state data, which are primarily acquired in real time and only arrive at the service provider with a considerable delay on the side of the main computer 8, can be processed quickly enough to generate the requested data or services in good time and transmit them back to the working computer 21.

On the part of the main computer 8 of the service provider 1, a large number of various types of associated data or services can be produced for the owner or operator of the working computer 21, as a function of the received machine state data. Possible examples are listed below.

For this purpose, a concrete implementation of an ePS service mentioned at the beginning and based on the present invention will be described.

The CNC/PLC machine equipment (PLC stands for programmable logic controller) is connected to the ePS server via the Internet. Machine data from the production process are depicted in real time via the ePS server and are compressed, analyzed and assessed there. The results obtained from these data with respect to machine condition, machine utilization, process stability, workpiece quality and the long-term state changes in the machine that are to be derived, are transmitted to the customer via the Internet.

The ePS system offers an open programming interface (API) for user and manufacturer. As a result, ePS customers can also integrate their own application/machine know-how in the form of an e-service. ePS customers can activate their desired e-services online from the ePS service range via the machine controller or via a PC.

The ePS service range comprises, for example, the following e-services:
  Machine services
  Machine performance
  Workpiece services
  Data management
  e-sales.

The ePS service "machine services" supports the commissioning (CAR, computer-aided runoff) and fault analysis in the event of service.

Via the "machine performance" service, the variance of the results of the cyclically repeated CAR messages can be shown. The e-service "workpiece services" secures the process stability and the workpiece quality via the real-time acquisition of the machine data. Furthermore, with this service, early detection of weak points is made possible by way of visualizing NC programs and their processing in the controller. The weak points, thus detected even before processing, can be eliminated.

Data management is a web-based archiving and management service for control data, such as NC programs, machine data and parameters. These data are useful, in particular, to customers who do not have their own EDP infrastructure. This service makes it possible for the customer to resume production quickly with high data integrity in the event of their own data losses.

Given the increasing complexity of machines and higher dependence between machine components and electrical equipment components, machine users (end-customers) and even machine manufacturers, rapidly run up against their limits when it is a case of increasing the productivity, the accuracy, the quality, or the process stability of the machine/plant.

To increase the productivity, the accuracy, the quality or the process stability of a machine/plant, a person with expert knowledge (in a special field) is typically sent to the machine site. In rare cases, a point-to-point connection from the automation component (for example a controller) via a modem to a computer at the machine manufacturer is made, and the expert at the machine manufacturer attempts to perform the optimization or elimination of faults via a "remote human machine interface".

The following business models then solve this described problem on the basis of the present invention using the previously described system. In this case, a distinction can be drawn between a business model (A) and the provision of services (B) via a business model, for example business model (A).

Business model A comprises, for example, the following measures:
  recording (real-time) data (for example program data, servo data, motor data, converter data, positions, sensor data) by means of an automation component; subsequent storage of these data in a memory;
  subsequent transmission of the data from the memory (for example under time control or event control) via the Internet into a computer (evaluation and analysis unit); subsequent evaluation/analysis/measurement of these data in a computer (generally automated and not carried out by people);
  then a reaction/response via various transmission paths (for example via the Internet, via e-mail, via mobile phone, via beeper, via radio, via telephone, etc.); then, if appropriate, closure of the "control loop" by recording (real-time) data (for example program data, servo data, motor data, converter data, positions, or sensor data).

Via such, or similar, business model, for example business model (A), the following services (B) can then be provided.

By evaluation, analysis and measurement of these data in a computer, for example, the following are meant:
  Electronic measurement of workpieces, tools and clamping means (from the recorded (real-time) data and not by measuring the physically present workpiece), firstly for the diagnosis of problems in the event of defective workpiece quality (as a result of excessive overruns, unstable controller conditions, faulty corrections, etc.), and, secondly, for the dialog-guided correction of the relationships.
  Indicating the relationships of process variables, for example laser output and feed speed, or tool rotational speed and feed speed. From these evaluations, conclusions can be inferred about process quality, fabrication tolerances, etc. and, if necessary, corrected. In the case of a satisfactory state of the tool (Well-focused laser, satisfactory milling tool state and geometry), a stable process can be documented. A stable process simultaneously means a stable result. Accordingly, in many cases subsequent measurements can be forestalled, or problems detected, without having to wait for measured results.
  Analysis of the tool paths (in particular on non-Cartesian machine tools) in the Cartesian coordinate system with possible correction or statement relating to a good part/poor part. For instance, in many parallel kinematic machines, geometric fault sources in the joints are not accessible for measurement. Such faults lead to the tool tips being moved incorrectly in geometric terms. Such problems can be recognized and corrected via redundant measuring systems.
  Monitoring of process variables with limiting value monitoring and/or correlation monitoring. Assessment of the limiting values/correlations with expert systems and correction or process termination.

Program analysis by executing a program in a virtual CNC (including interpolation data, position controller data) following objectives: optimizing the running time, optimizing the workpiece quality, optimizing the tool change, monitoring collisions, monitoring geometric data, etc.

Automatic creation of commissioning logs for the seamless documentation of the commissioning state. Here, a series of measurements, such as circular shape tests, positional measurements, measurement of speed profiles, drive currents and torques, is carried out. These show, first of all, the satisfactory state of the machine during the commissioning. Second, they serve as an "electronic fingerprint" of the machine, which is suitable to detect wear-induced changes in the machine during operation in good time. The measurements that form the electronic fingerprint may be combined into a macro, and can then be repeated periodically in an identical way in the form of batch jobs, as they are known (diagnostic batch).

For instance, a periodically repeated circular shape test can be used to detect loose or cyclic faults as a result of wear of the recirculating ball screw or of gearboxes or other force transmission mechanisms, such as toothed belts, etc.

Figure 5:
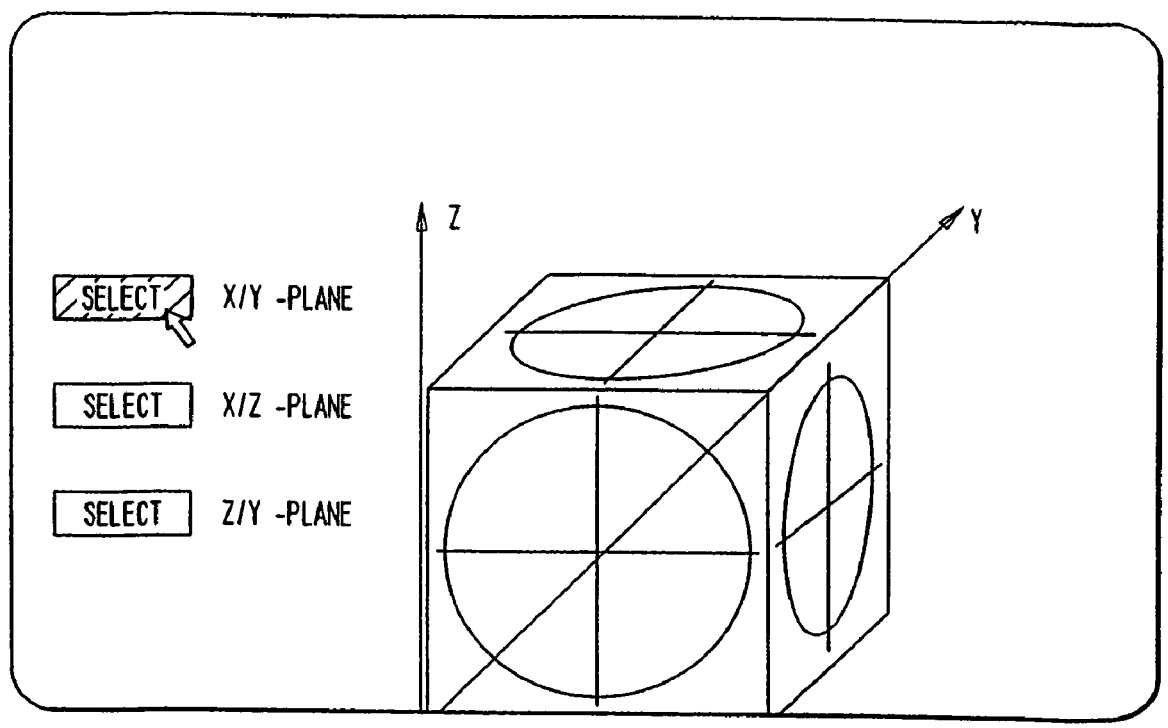
FIG. 5 to FIG. 7 show various phases and parameters for carrying out a circular shape test with a system according to the invention.
Figure 6:
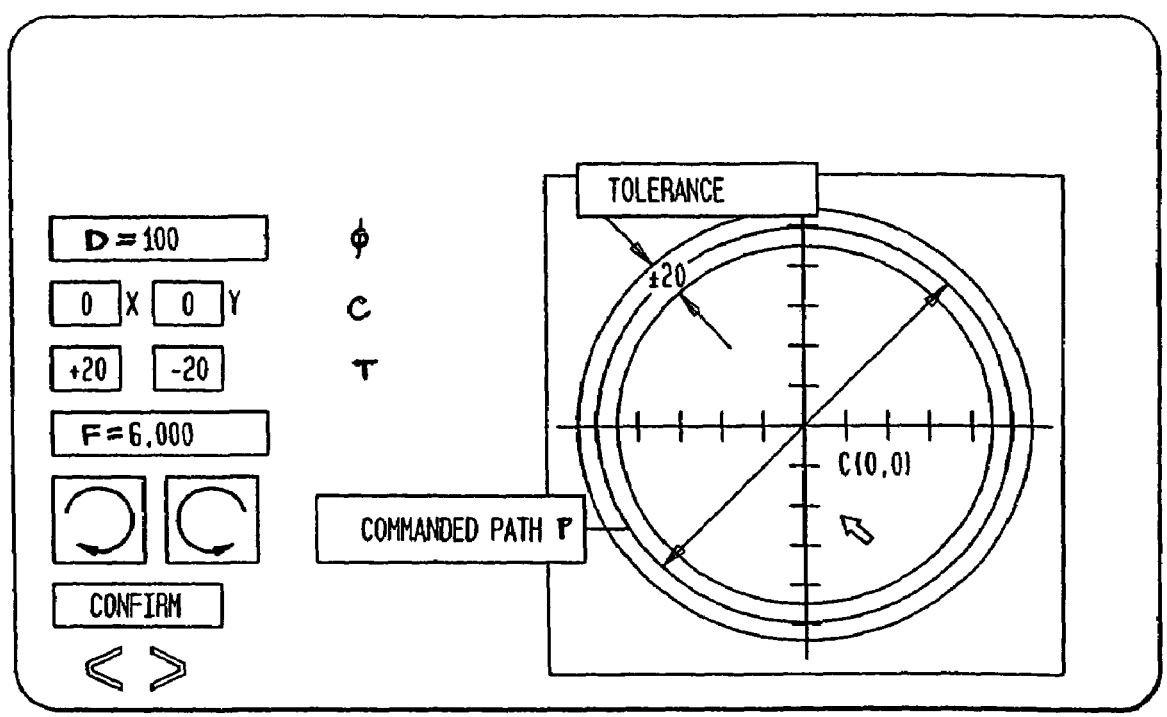
Figure 7:
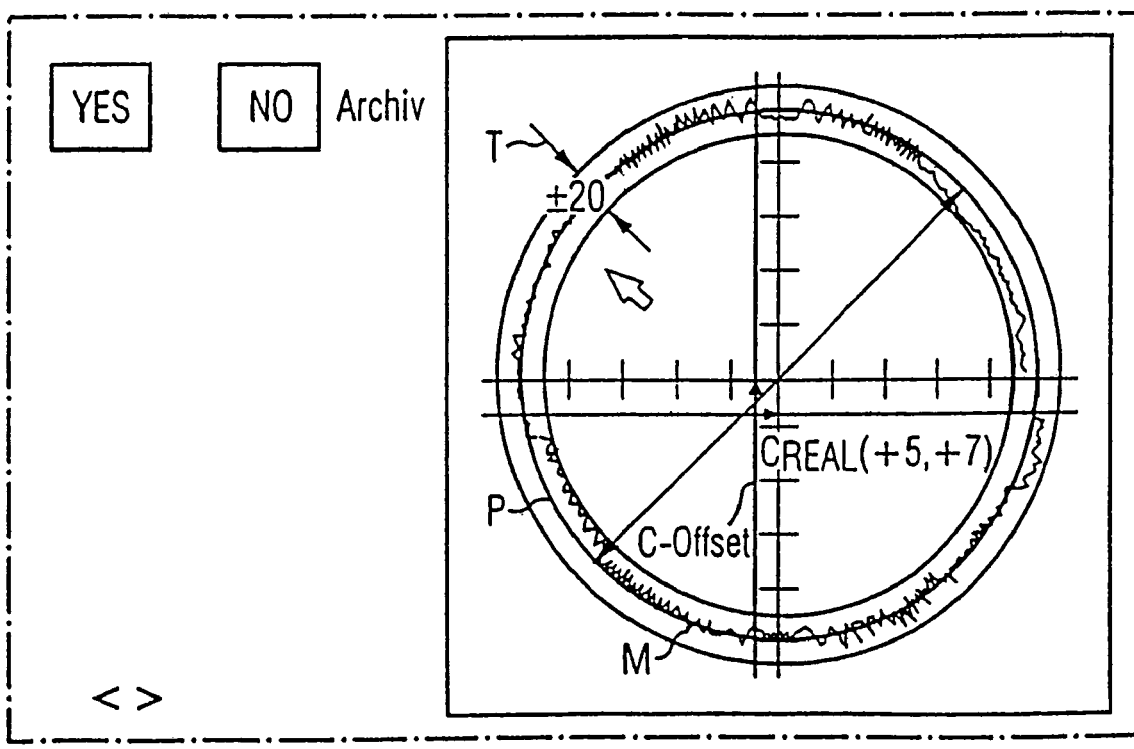

An example of such a circular shape test, which is carried out via the described ePS system according to the invention, is represented in FIG. 5 to FIG. 7, whereby in each case the machine state data being acquired and present on the side of the main computer, and communicated to the provider of the automatic service "circular shape test" via the Internet, are produced graphically. In this way, either a specialist at the manufacturer can perform the required actions on the machine manually, or this can preferably likewise be carried out automatically via an electronic service via the Internet connection, such that, if required, appropriate correction parameters are transmitted to the working computer.

To this end, the measurement method and then the plane to be tested, x-y, x-z or z-y, is first selected (cf. FIG. 5 with selection of the x-y plane). Further on, the parameters for performing the circular shape test are predefined. These are, in particular, the diameter D, center C, tolerance band T, feed speed F and direction (in the clockwise or counterclockwise direction), which defines the predefined circular path P (cf. FIG. 6).

FIG. 7 shows the actual position values, determined by means of the aforementioned parameters, of the circle described by the machine, that is to say the measured contour M, which may deviate from the ideal path P. In addition, a possible shift C-offset with respect to the specified center C of the circle is indicated. There is, then, the possibility of archiving the resultant data, it being possible for this purpose for the data to be linked with an identification code I of the machine tested and possibly also of the end-customer.

On the basis of the irregularities determined in this way, it is then automatically possible, by means of appropriate software from the manufacturer, to generate corrective measures and, as an automatic service, to perform an adaptation or compensation of the causative parameters or components of the machine.

Irregularities of the axle guidance systems can be detected by means of an irregular current waveform or speed waveform (waviness measurements). Instabilities of the position controller resulting from altered frictional conditions can be discerned by observing dynamic positional behavior (overshooting). The object of the measurements is, for example, to avoid wear-induced stoppages of the machine, as a result of the fact that the wear is detected early and in an automated manner (long-term wear diagnosis); and affected parts can be procured in good time (for example by means of automatic orders via e-sales) and can be replaced during planned maintenance periods.

If external measuring means are used (for example a ball bar or laser measuring system), a further object is to calibrate internal measuring systems in order to be able to dispense with external measuring means in the case of repeated measurements.

For example, in the case of a circular shape test, which uses only the motor measuring system, looseness in gearboxes or in the recirculating ball screw cannot be readily detected in this way, but can be seen very easily by using a ball bar. If a plurality of parameters are recorded simultaneously (for example overrun and currents in additional to the measuring system), looseness can nevertheless be detected, assuming appropriate inertial conditions.

From the comparison between one and the same measured variable from different sources (for example external distance measured signal, linear scale or motor measuring system), far-reaching conclusions may be drawn as to the machine state.

Automatic creation of service and maintenance logs for the seamless documentation of the machine history (cf. the archiving possibility indicated in FIG. 7). In case of a problem, therefore, remote diagnosis of a machine is made very easy. Design problems can be detected in good time by means of frequency analysis of specific faults and can be eliminated.

The construction of expert networks via ePS host about the processing problems in extremely different areas can be exchanged. For instance, in the event of problems, requests to a defined group of other experts can be addressed directly by the machine.

Evaluation for the diagnosis of exceptional and fault situations. In this case, fault lists, existing alarms, parameters, of the current machine state at the time of the occurrence of the fault (such as the PLC status, the state of the I/O, the desired and actual positions as a crash monitor) are recorded in the manner of a flight recorder and are available both to the machine operator and to service engineers from the supplier immediately via the web (service history). At the same time, via a configurable list, specific persons are informed about the problem via SMS or e-mail. This makes it possible to offer the operator a dialog-guided aid for eliminated faults. If this does not lead to the elimination of the fault, quick and efficient remote diagnosis is possible together with the standard measurements described above. If no success is achieved, an attempt is made to solve the problem with the aid of a multimedia remote operation. As a result, the service operations on-site can be replaced, at least partially. In the event of unavoidable service operations, these can be better prepared for.

Monitoring of overhaul plans by means of appropriate data exchange with the host. If appropriate, in the event of non-compliance, the machine can be temporarily blocked. This can be controlled by appropriate acknowledgement functions.

Visualization of the NC program in the form of tool paths, points and their linking to form a virtual workpiece surface (surface feedback), which can be investigated via various illuminations from different directions and sources.

Visualization of the control behavior (interpolated points, position controller behavior) in the same way.

Communication of machine state data to higher-order systems such as: ERP systems, with the objective of optimizing the overall fabrication and improving production planning.

Saving and archiving configuration data, user data and programs with the objective of being able to access all versions of the control data at any time, in order to be able to reconstruct states, if appropriate, or to detect problematic changes (data comparison). The possibility of complete backup via remote server, of interest to relatively small firms.

The product data for automation components (controllers, drives) and other machine components (parts lists, product descriptions, etc.) are available at any time via the ePS host.

It is not necessary for any person with expert knowledge to be dispatched to the machine in order to perform the above-described improvements, optimizations, etc. It is often even possible, without the system according to the invention, for a number of persons with expert knowledge to be sent to the machine. With this invention, the expert knowledge is brought to the machine via the Internet and, at the machine, only the machine operator is available in order to confirm possible machine (travel) commands.

The use of a browser 23 (cf. FIG. 4) is not absolutely necessary; a direct connection to the Internet or to another communication network may also be made. With regard to the abovementioned trace functionality, mention should also be made of the fact that such a function generally supplies control and drive data in a particularly optimal fashion. However, whether such a functionality is provided directly, or with the inclusion of additional services or modules, generally depends on the application. A distinction is generally drawn between a "normal" trace functionality, as it is known, in which a trace is started and ended at fixedly defined times or events. A transfer of acquired machine state data is then initiated only as soon as the trace has been ended. As an alternative to this, there is the possibility of providing an "endless" trace functionality, as it is known. In this case, the trace runs as an application in the background and a continuous transfer of acquired data away from the working computer is carried out (for example to an HMI).

A trace functionality is generally given only read access to the control core NCK. Write access, for example by means of a function generator, is inconsistent with the conventional definition of a trace functionality and, therefore, generally has to be added as an additional function to the usual trace functionality. This is necessary, for example, when a function generator and a trace functionality have to be implemented as an externally coupled function for specific automated procedures.

A trace functionality can generally be configured offline. However, as soon as a trace has been initiated, the conditions in the running operation may not be changed. For this purpose, the trace must first be stopped or broken off.

Possible functions for a trace in the context of the present invention are, for example, the commissioning of a machine, fault detection, problems with applications (above all in the case of complex applications with a plurality of channels and synchronous actions), sporadic problems relating to the running time of the machine, tool breakage, or logical analyses such as those from telescope or tachometer functions.

Depending on the application, there is a large number of items of information to be acquired for the machine state data to be acquired. These include, inter alia:

system variables, drive signals, PLC flags and various types of events such as status, status changes or binary signals such as alarm signals, etc.;

access to local user program data (for example NC program, flags in the PLC program);

transferring acquired local data into suitable global variables.

All these data, mentioned by way of example, can be used as a trigger for the sequence tracking or trace functionality.

Under certain circumstances, there may be specific requirements for carrying out sequence tracking or trace functionality, for example in connection with PLC data. For access to PLC peripherals or signals or flags in a user program, it can be advantageous if this is possible without any influence on the PLC itself. Above all, access to user program data (I/O, flags, etc.), and the possibility of synchronizing the starting point for recording machine state data via a user program, is advantageous, in accordance with a further embodiment of the invention. Another advantageous embodiment of the invention includes up to 32 PLC signals, which can be monitored at the same time within the context of sequence tracing or trace functionality. To this end, available buffer data in a user program can also advantageously be stored.

The acquisition of machine state data is advantageously carried out in a manner tailored to the automatic service operated. This is carried out particularly effectively if only the requisite items of information are acquired and this is done no more often than necessary. In addition, a clear distinction should be drawn between continuous signals and sporadic events. If possible, data compression is carried out during its acquisition, while taking run-time effects into account. The entire spectrum of machine information is acquired only if the purpose for which the data will be acquired is not known or defined. Depending on the application, preference is given, for example, to ring buffer memories, in which, according to their operating principle, the oldest items of information or those lying furthest back are overwritten, while in the case of a wait-loop memory or a queue, as it is known, it is always the newest information that is overwritten when the wait-loop is full.

There could be further supplementary information, for example in a time stamp or values from timers, etc. In the case of the analysis of the causes of critical errors, the sequence tracking or trace functionality will be carried out as independently as possible from the malfunction. This means that, during continued operation after a fault, data acquired before the fault will be stored safely. In the ideal case, every variable to be acquired in connection with the machine state data will be provided as a dedicated function with its own time characteristic, in order to keep the occurrence of data as low as possible.

According to a further advantageous refinement of the invention, the acquisition of machine state data is carried out under time control or event control. In addition, an additional file or an additional archive can be generated automatically, which can also preferably contain subprograms. In a trace file, a reference, for example a pointer, to this archive or this file is then sent. In this way, it is possible for possible inconsistencies in connection with a manual implementation of such a function to be prevented from the start. For example, manual archiving can even be carried out several days after the data acquisition, since it is possible for the configuration already to have changed during this time. This can also be specified by means of a specific application, such that conditions do not have to be satisfied by internal interfaces.

According to a further advantageous refinement of the present invention, changes in the configuration of distributed components are made automatically. This also applies to the acquisition and provision of available meta-information (data about data). The human-machine interface (HMI) can be used in this connection as an interface for an internal configuration. As a result, a simpler cost-effective expansion for new signals can also be provided, by the latter being linked with sequence tracking or trace functionality in a straightforward way via the HMI interface (merge, as it is known).

One possible procedure for controlling what has been outlined above preferably provides the following functions:

Starting conditions (manual, NC program, PLC, synchronized, time-controlled, continuous or via external signals) and stop/trigger conditions (manual, NC program, PLC, synchronized, time-controlled, overflow from internal summations or via external signals).

Such trigger conditions are preferably to be set within certain states:
- for example, trigger by individual bits, by a change in state variables from a state Z1 to a state Z2 (exactly defined state transitions) or by text instead of numeric codes;
- by a trigger in the form of uniquely defined NC program commands or associated command numbers;
- trigger by the nth occurrence of a predefined relevant code.

Nested conditions are likewise possible, such as: condition A must be satisfied, then condition B or condition C and, if condition E is satisfied, data are acquired until condition F occurs.

Following an accident (for example tool breakage) or a stoppage, it is ensured that all the necessary resources are available as far as possible, and as soon as data are transmitted. As soon as a critical fault has occurred, it is important that a condition associated with this fault is defined, so that automatic restarting is ruled out.

Suitable preparation of data is preferably carried out at the human-machine interface (HMI). In addition, depending on requirements, it is possible to bind an application exclusively to one file. Otherwise, a serial COM link is possible, in order to permit blockwise access via a continuous data stream (without buffering in the file). Among others, three different use classes could and should be operated:

1. prepared use, such as applications of control software manufacturers on the human-machine interface (HMI), such as visualization of a sequence trace, IBN or diagnostic tools
2. OEM user (working computer or client applications)
3. Internet or web-based services A sequence trace preferably has a structure that is open to the user. Open and freely accessible interfaces for the configuration include controls (start, stop) and analysis possibilities (data format) for OEMs.

According to a further advantageous embodiment of the invention, the display of a sequence trace is carried out in a manner comparable with a logic analyzer oscilloscope. This can be used to display signals from various sources. In addition, references to a specific program module can be displayed. Cursor and zoom functions are advantageously also provided. It is beneficial if at least four signals can be made visible at the same time. In addition, filters are preferably provided which permit the selection of signals. Furthermore, differential signals can be output or important events can be assigned, by which means users with little knowledge gain a better understanding of the information or machine state data acquired.

In order to ensure high robustness during the data acquisition, the following possibilities are particularly suitable:
- as far as possible, data should be accessible even after a defect.
- sudden faults during sequence tracking should not result in a data overflow, and suitable reactions in the case of scarce resources should be provided.
- after the occurrence of a fault, it is ensured that files with acquired machine state data cannot be deleted at a later time.

In the following, a further selection of possible services or data contents will be listed:
- Machine-related services such as
  - analysis of machine operating times, failure times and capacities
- Axis analyses such as
  - individual analysis, status
  - simulation of axes
  - measurement of the amplitudes
  - Fourier transformation and generation of Bode diagrams with
    - identification of eigenfrequencies
    - trend analyses
- Axis optimizations and optimizations of axis parameters such as
  - engagement speed
  - acceleration
  - jolt
  - filter
  - KV factor
  - friction compensation
  - looseness compensation
- Checking of machine data such as
  - accuracy and consistency
  - consistency of the data memories
  - consistency of functions and machine data
- Wear analysis such as
  - path accuracy
  - trend analyses
  - increasing play in the joints
  - friction problems (for example lubrication)
  - transmission problems between motors and axes
- Monitoring of processes with, for example,
  - drive parameters
  - instantaneous utilization or capacity
  - torques
  - jolt
  - rotational speed
  - temperatures
  - trend analyses
- Machine inspections with
  - circular shape tests
  - measurements of the stiffnesses of
  - linearaxes
  - C axes
- Machine calibrations with
  - feeler gage
  - single-axis calibration
  - C-axis calibration
  - workpiece measurements
- Workpiece-related services with
  - workpiece geometry
  - measurement of the track fidelity
  - trace functionality in relation to the current objective in tabular or graphical form
  - workpiece surface and quality
- Process analyses with
  - determination and documentation of the feed speed and cutting speed
  - measurement of the cutting force via, for example, laser power Fourier transformation and frequency observation
Software sales and marketing with
supply of new versions
supply of fault corrections (service packs)
supply of communication software and hardware for the provision of services.

The above description of preferred embodiments according to the invention is given for the purpose of illustration. These exemplary embodiments are not exhaustive. Nor is the invention restricted to the precise form indicated; instead numerous modifications and changes are possible within the context of the technical teaching specified above. One preferred embodiment was selected and described in order to indicate the basic details of the invention and practical applications, in order to place those skilled in the art in a position to implement the invention. A large number of preferred embodiments and further modifications come into consideration in the case of specific areas of application.

The invention claimed is:

1. In a host computer in communication via a data communication link with a client computer that is programmed for controlling at least one aspect of an industrial processing machine, for acquiring machine state data from the industrial processing machine, and for transmitting the acquired machine state data to the host computer, wherein the client computer includes a system for monitoring of the processing machine and a sensor for acquiring machine state data, a method for computer-aided production and provision of machine-related content that comprises at least one of the group consisting of data and services for the industrial processing machine, the method comprising the steps of:
   receiving machine state data from the client computer via the data communication link;
   generating the content as a function of the received machine state data; and
   transmitting the content to the client computer via the data communication link
   transmission of information relating to the availability of machine-related content to the client computer;
   receiving, from the client computer, a request for machine-related content;
   transmission of information relating to machine state data to be acquired by the client computer in connection with the request for machine-related content;
   receiving from the client computer the data acquired by the client computer;
   generating of the requested machine-related content;
   transmission of the machine-related content to the client computer;
   receiving information relating to payment for content requested by the client computer; and
   storing the information related to the payment.

2. The method according to claim 1, wherein the machine state data comprises real-time data acquired by the client computer.

3. The method according to claim 2, comprising the further step of receiving over the data communication link from the client computer a unique identification means associated with the client computer.

4. The method according to claim 1, wherein the machine state data comprises at least one of the group consisting of program data, servo data, motor data, converter data, position data and sensor data.

5. The method according to claim 1, wherein the received machine state data comprises data that is buffered in a data storage means by the client computer prior to its receipt by the host computer.

6. The method according to claim 5, wherein the step of receiving the machine state data comprises receiving machine state data transmitted to the host computer under time control.

7. The method according to claim 5, wherein the step of receiving the machine state data comprises receiving machine state data transmitted to the host computer under event control.

8. The method according to claim 1, further comprising the step of analyzing, in the host computer, received machine state data.

9. The method according to claim 1, comprising the further steps of:
   generating a data structure to accommodate data relating to generated content;
   storing, in the data structure, data representing the unique identification code; and
   storing, in the data structure, data relating to the content.

10. The method according to claim 9, further comprising the steps of:
    determining measured data relating to the content transmitted to the client; and
    storing, in the data structure, data relating to the measured data.

11. The method according to claim 1, further comprising the steps of:
    generating data representing first price information for requested content as a function of fixed costs for a predetermined, repeated time period;
    generating data representing second price information as a function of variable costs associated with generating and transmitting the content.

12. The method according to claim 11, wherein the repeated time period comprises a monthly time period.

13. The method according to claim 1, wherein the content relates to electronic measurement of workpieces for problem diagnosis.

14. The method according to claim 1, wherein the content relates to the electronic measurement of tools for problem diagnosis.

15. The method according to claim 1, wherein the content relates to the electronic measurement of clamping means for problem diagnosis.

16. The method according to claim 1, wherein the content relates to indication of the relationships of process variables.

17. The method according to claim 1, wherein the content relates to monitoring of process variables.

18. The method according to claim 1, wherein the content relates to program analysis by processing a program in a virtual simulation of the processing machine.

19. The method according to claim 1, wherein the content relates to automatic creation of commissioning logs for documentation of a commissioning state.

20. The method according to claim 1, wherein the content relates to evaluation for diagnosis fault situations.

21. The method according to claim 1, wherein the content relates to saving and archiving at least one of the group consisting of configuration data, user data and programs, for the reconstruction of machine states.

22. The method according to claim 1, wherein the content relates to saving and archiving at least one of the group consisting of configuration data, user data and programs for the detection of machine state changes caused by machine problems.

23. In a host computer in communication via a data communication link with a client computer that is programmed for controlling at least one aspect of an industrial processing machine, for acquiring machine state data from the industrial processing machine, and for transmitting the acquired machine state data to the host computer, a method for computer-aided production and provision of machine-related content that comprises at least one of the group consisting of data and services for the industrial processing machine, the method comprising the steps of:

receiving machine state data from the client computer via the data communication link;

generating the content as a function of the received machine state data; and transmitting the content to the client computer via the data communication link, wherein the content relates to indication of the relationships of process variables, and wherein the process variables comprise variables selected from the group consisting of laser output, feed speed and tool rotational speed.

24. In a host computer in communication via a data communication link with a client computer that is programmed for controlling at least one aspect of an industrial processing machine, for acquiring machine state data from the industrial processing machine, and for transmitting the acquired machine state data to the host computer, a method for computer-aided production and provision of machine-related content that comprises at least one of the group consisting of data and services for the industrial processing machine, the method comprising the steps of:

receiving machine state data from the client computer via the data communication link;

generating the content as a function of the received machine state data; and transmitting the content to the client computer via the data communication link;

wherein the content relates to analysis of the tool paths in a Cartesian coordinate system.

25. The method according to claim 24, wherein the content further relates to correction of a part.

26. In a host computer in communication via a data communication link with a client computer that is programmed for controlling at least one aspect of an industrial processing machine, for acquiring machine state data from the industrial processing machine, and for transmitting the acquired machine state data to the host computer, a method for computer-aided production and provision of machine-related content that comprises at least one of the group consisting of data and services for the industrial processing machine, the method comprising the steps of:

receiving machine state data from the client computer via the data communication link;

generating the content as a function of the received machine state data; and transmitting the content to the client computer via the data communication link;

wherein the content relates to monitoring of process variables, and wherein the content further relates to limiting value monitoring.

27. The method according to claim 26, wherein the content further relates to correlation monitoring.

* * * * *